(12) United States Patent
Cha et al.

(10) Patent No.: US 11,326,513 B1
(45) Date of Patent: May 10, 2022

(54) HYBRID POWER GENERATION EQUIPMENT

(71) Applicant: DOOSAN HEAVY INDUSTRIES & CONSTRUCTION CO., LTD., Changwon (KR)

(72) Inventors: Song-Hun Cha, Osan (KR); Sung Gju Kang, Yongin (KR); Ki Hyun Lee, Daegu (KR)

(*) Notice: Subject to any disclaimer, the term of this patent is extended or adjusted under 35 U.S.C. 154(b) by 0 days.

(21) Appl. No.: 17/120,198

(22) Filed: Dec. 13, 2020

(30) Foreign Application Priority Data

Oct. 30, 2020 (KR) .................. 10-2020-0143273
Dec. 2, 2020 (KR) .................. 10-2020-0166651

(51) Int. Cl.
| | |
|---|---|
| *F02C 6/04* | (2006.01) |
| *H02K 7/18* | (2006.01) |
| *F02C 7/10* | (2006.01) |
| *F01D 15/00* | (2006.01) |
| *F01K 11/02* | (2006.01) |

(52) U.S. Cl.
CPC .............. *F02C 6/04* (2013.01); *F01D 15/00* (2013.01); *F01K 11/02* (2013.01); *F02C 7/10* (2013.01); *H02K 7/1823* (2013.01); *F05D 2220/31* (2013.01); *F05D 2220/32* (2013.01); *F05D 2220/72* (2013.01); *F05D 2220/74* (2013.01); *F05D 2220/76* (2013.01); *F05D 2240/35* (2013.01); *F05D 2260/20* (2013.01)

(58) Field of Classification Search
CPC ... F02C 6/04; F02C 7/10; F01D 15/00; H02K 7/1823; F05D 2220/32; F05D 2220/72; F05D 2220/74; F05D 2220/76; F05D 2240/35; F05D 2260/20; F05D 2220/31; F01K 11/02
See application file for complete search history.

(56) References Cited

U.S. PATENT DOCUMENTS

| | | | | |
|---|---|---|---|---|
| 3,971,211 A | * | 7/1976 | Wethe ....................... | F01K 7/32 60/39.181 |
| 6,530,208 B1 | * | 3/2003 | Sugishita ............... | F01K 23/106 60/39.182 |

(Continued)

*Primary Examiner* — Pedro J Cuevas
(74) *Attorney, Agent, or Firm* — Harvest IP Law, LLP

(57) ABSTRACT

Disclosed is a hybrid power generation facility. The hybrid power generation facility includes a gas turbine including a compressor configured to compress air introduced from an outside, a combustor configured to mix the compressed air with fuel and to combust the air and fuel mixture, and a turbine configured to produce power with first combustion gas discharged from the combustor, a boiler configured to burn a mixture of the first combustion gas and air, a first water heat exchanger configured to pass second combustion gas discharged from the boiler and to heat water through heat exchange between the water and the second combustion gas, a water supply device configured to supply water to the first water heat exchanger, a steam turbine through which steam generated in the boiler passes, and a fuel heat exchanger configured to pass fuel supplied to the combustor and to pass a portion of water that is returned to the water supply device from the first water heat exchanger and has a higher temperature than the water supplied to the first water heat exchanger.

19 Claims, 6 Drawing Sheets

(56) References Cited

U.S. PATENT DOCUMENTS

| | | | | |
|---|---|---|---|---|
| 6,668,538 | B2* | 12/2003 | Sugishita | F01K 23/106 60/39.182 |
| 8,001,760 | B2* | 8/2011 | Harada | F01K 23/10 60/39.182 |
| 8,181,439 | B2* | 5/2012 | Harada | F01K 23/101 60/39.182 |
| 10,480,406 | B2* | 11/2019 | Iijima | B01D 53/1475 |
| 10,900,418 | B2* | 1/2021 | Selfridge | F02C 7/224 |
| 2003/0037534 | A1* | 2/2003 | Sugishita | F02C 7/16 60/39.182 |
| 2003/0126852 | A1* | 7/2003 | Sugishita | F01K 23/106 60/39.182 |
| 2010/0089023 | A1* | 4/2010 | Harada | F01K 23/10 60/39.182 |
| 2011/0146225 | A1* | 6/2011 | Harada | F02C 7/047 60/39.182 |
| 2018/0119618 | A1* | 5/2018 | Erickson | F01K 11/02 |
| 2019/0093563 | A1* | 3/2019 | Selfridge | F02C 6/18 |
| 2021/0095572 | A1* | 4/2021 | Fujimura | F01D 25/12 |
| 2021/0299609 | A1* | 9/2021 | Matake | B01D 53/1475 |

* cited by examiner

HYBRID POWER GENERATION EQUIPMENT

CROSS REFERENCE TO RELATED APPLICATIONS

This application claims priority to Korean Patent Application No. 10-2020-0143273, filed on Oct. 30, 2020 and Korean Patent Application No. 10-2020-0166651, filed on Dec. 2, 2020, the disclosures of which are incorporated herein by reference in their entireties.

BACKGROUND

1. Field

The present disclosure relates to a hybrid power generation facility, and more particularly, to a hybrid power generation facility for generating electric power using a driving force generated by a gas turbine and a steam turbine.

2. Description of the Related Art

There are various types of power plants depending on fuel used. A thermal power plant heats water in a boiler using thermal energy generated by burning fuel such as coal, heavy oil, and natural gas, and passes a high temperature and high pressure superheated steam produced through a steam turbine so that a generator connected to the steam turbine generates electricity.

The thermal power plant includes main equipment and balance of plant (BOP) systems. The BOP systems include, for example, a fuel supply system, a fuel treatment system, a condensate and water supply system, a cooling water system, a reprocessing system, and auxiliary systems such as air treatment system, water treatment system, service water treatment system, and waste water treatment system. The main equipment and BOP systems play their roles in electricity production.

On the other hand, a combined cycle power plant is a power plant that combines a primary power generation cycle in which a gas turbine is driven with fuel such as natural gas or diesel and a secondary power generation cycle in which a steam turbine is driven with steam generated by passing the heat of exhaust gas discharged from the gas turbine through a heat recovery steam generator (HRSG). The combined cycle power plant has the advantage of 10% higher thermal efficiency, less pollution, and shorter resting time than conventional thermal power plants.

Referring to FIG. 1, in a conventional hybrid power generation facility 10, natural gas supplied to a gas turbine 11 has a low temperature. Therefore, an amount of fuel used by a gas turbine is increased, an overall operation efficiency of the facility is decreased, and an emission of carbon dioxide is increased.

SUMMARY

The present disclosure has been made in view of the problems occurring in the related art and an objective of the present disclosure is to provide a hybrid power generation facility capable of improving a fuel efficiency of a gas turbine and reducing emission of carbon dioxide by preheating fuel supplied to the gas turbine.

According to an aspect of the present disclosure, there is provided a hybrid power generation facility including: a gas turbine including a compressor configured to compress air introduced from an outside, a combustor configured to mix the compressed air with fuel and to combust the air and fuel mixture, and a turbine configured to produce power with first combustion gas discharged from the combustor; a boiler configured to burn a mixture of the first combustion gas and air; a first water heat exchanger configured to pass second combustion gas discharged from the boiler passes and to heat water through heat exchange with the second combustion gas; a water supply device configured to supply water to the first water heat exchanger; a steam turbine through which steam generated in the boiler passes; and a fuel heat exchanger configured to pass fuel supplied to the combustor and to pass a portion of water that is returned to the water supply device from the first water heat exchanger and has a higher temperature than water supplied to the first water heat exchanger.

The hybrid power generation facility may further include: a first water pipeline configured to transfer water from the water supply device to the first water heater exchanger; a second water pipeline configured to return water discharged from the first water heat exchanger to the water supply device; and a third water pipeline branched from the second water pipeline and configured to supply water having a higher temperature than water supplied to the first water heat exchanger to the fuel heat exchanger.

The hybrid power generation facility may further include a fourth water pipeline configured to transfer water discharged from the fuel heat exchanger to a condenser.

The steam turbine may include an intermediate-pressure turbine and a low-pressure turbine connected to the intermediate-pressure turbine and configured to pass steam having a pressure lower than that of steam flowing through the intermediate-pressure turbine passes therethrough. The water supply device may include an intermediate-pressure water supplier configured to receive steam passing through the intermediate-pressure turbine and a low-pressure water supplier configured to receive steam passing through the low-pressure turbine. The first water heat exchanger is configured to pass water passing through the low-pressure water supplier.

The hybrid power generation facility may further include a second water heat exchanger configured to pass second combustion gas discharged from the boiler and to pass water discharged from the intermediate-pressure water supplier.

The hybrid power generation facility may further include: a first boiler pipeline configured to pass second combustion gas discharged from the boiler; a second boiler pipeline branched from the first boiler pipeline and configured to supply second combustion gas to the second water heat exchanger; and a third boiler pipeline configured to connect the first water heat exchanger and the second water heat exchanger.

The hybrid power generation facility may further include: an air preheater connected to the first boiler pipeline and configured to pass second combustion gas flowing through the first boiler pipeline; a fourth boiler pipeline configured to pass second combustion gas discharged from the first water heat exchanger; and a fifth boiler pipeline configured to connect the air preheater and the fourth boiler pipeline and transfer second combustion gas discharged from the air preheater to the fourth boiler pipeline.

The hybrid power generation facility may further include an auxiliary heat exchanger configured to pass water supplied from a condenser to the low-pressure water supplier and to pass carbon dioxide that is collected from the second combustion gas discharged from the boiler and is compressed to heat water.

The hybrid power generation facility may further include a third water heat exchanger disposed between the first water heat exchanger and the second water heat exchanger and configured to pass second combustion gas discharged from the second water heat exchanger before flowing into the first water heat exchanger and to pass a portion of water that has passed through the first water heat exchanger and has a higher temperature than water supplied to the first water heat exchanger before flowing into the fuel heat exchanger.

The hybrid power generation facility may further include: a sixth boiler pipeline configured to transfer second combustion gas from the second water heat exchanger to the third water heat exchanger; a seventh boiler pipeline configured to transfer second combustion gas from the third water heat exchanger to the first water heat exchanger; a fifth water pipeline branched from the second water pipeline and configured to supply water having a higher temperature than water supplied to the first water heat exchanger to the third water heat exchanger; and a sixth water pipeline configured to supply water having a higher temperature than water supplied to the third water heat exchanger to the fuel heat exchanger.

The hybrid power generation facility may further include: an auxiliary heat exchanger configured to pass water supplied from a condenser to the water supply device and to pass carbon dioxide that is collected from the second combustion gas discharged from the boiler and is compressed to heat water; a seventh water pipeline configured to transfer water from the auxiliary heat exchanger to the water supply device; a second water heat exchanger configured to pass second combustion gas discharged from the boiler; a third water heat exchanger disposed between the first water heat exchanger and the second water heat exchanger and configured to pass second combustion gas supplied to the first water heat exchanger; an eighth water pipeline branched from the seventh water pipeline and configured to supply water to the third water heat exchanger; and a ninth water pipeline configured to transfer water having a higher temperature than water supplied to the third water heat exchanger from the third water heat exchanger to the fuel heat exchanger.

The hybrid power generation facility may further include: a fuel pipeline configured to connect the fuel heat exchanger and the combustor; a temperature sensor installed in the fuel pipeline and configured to measure a temperature of fuel flowing through the fuel pipeline; and a water valve installed in the fourth water pipeline and configured to adjust a flow rate of water flowing through the fourth water pipeline according to a water temperature measured by the temperature sensor.

The hybrid power generation facility may further include: a first shut-off valve installed in the third water pipeline; and a second shut-off valve installed in the fourth water pipeline.

The second shut-off valve may be disposed on a downstream side of the water valve in a flow direction of water flowing through the fourth water pipeline.

The temperature sensor may include a plurality of temperature sensors, and the water valve may adjust a flow rate of water according to an average value of the temperatures measured by the plurality of temperature sensors.

The hybrid power generation facility according to the present disclosure is designed such that the fuel heat exchanger is provided in front of the combustor of the gas turbine and the fuel supplied to the combustor is preheated in the fuel heat exchanger and then supplied to the combustor. Therefore, the operation efficiency of the gas turbine and the overall operation efficiency of the facility are improved, and carbon dioxide emissions can be reduced.

DETAILED DESCRIPTION OF THE DISCLOSURE

Figure 1:
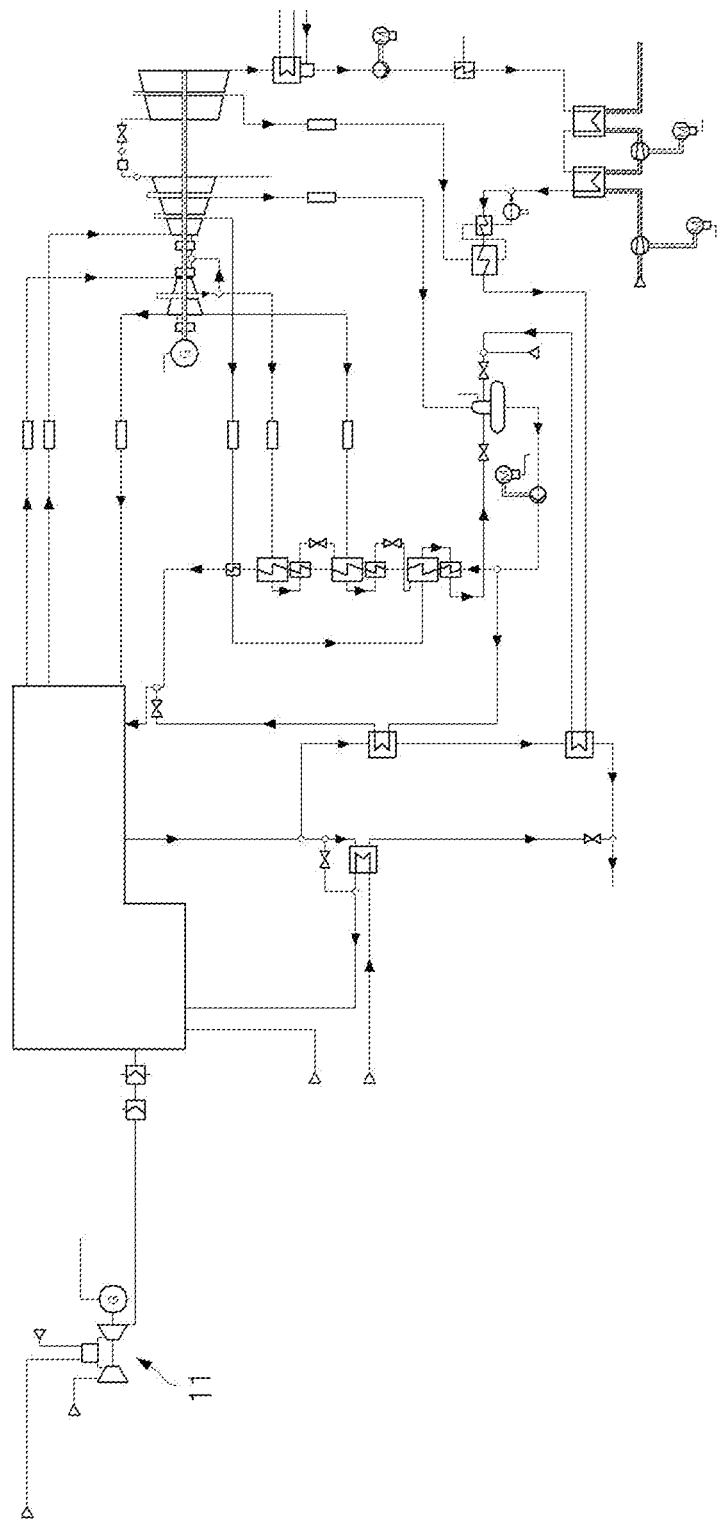
FIG. 1 is a diagram of a hybrid power generation facility according to a related art.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
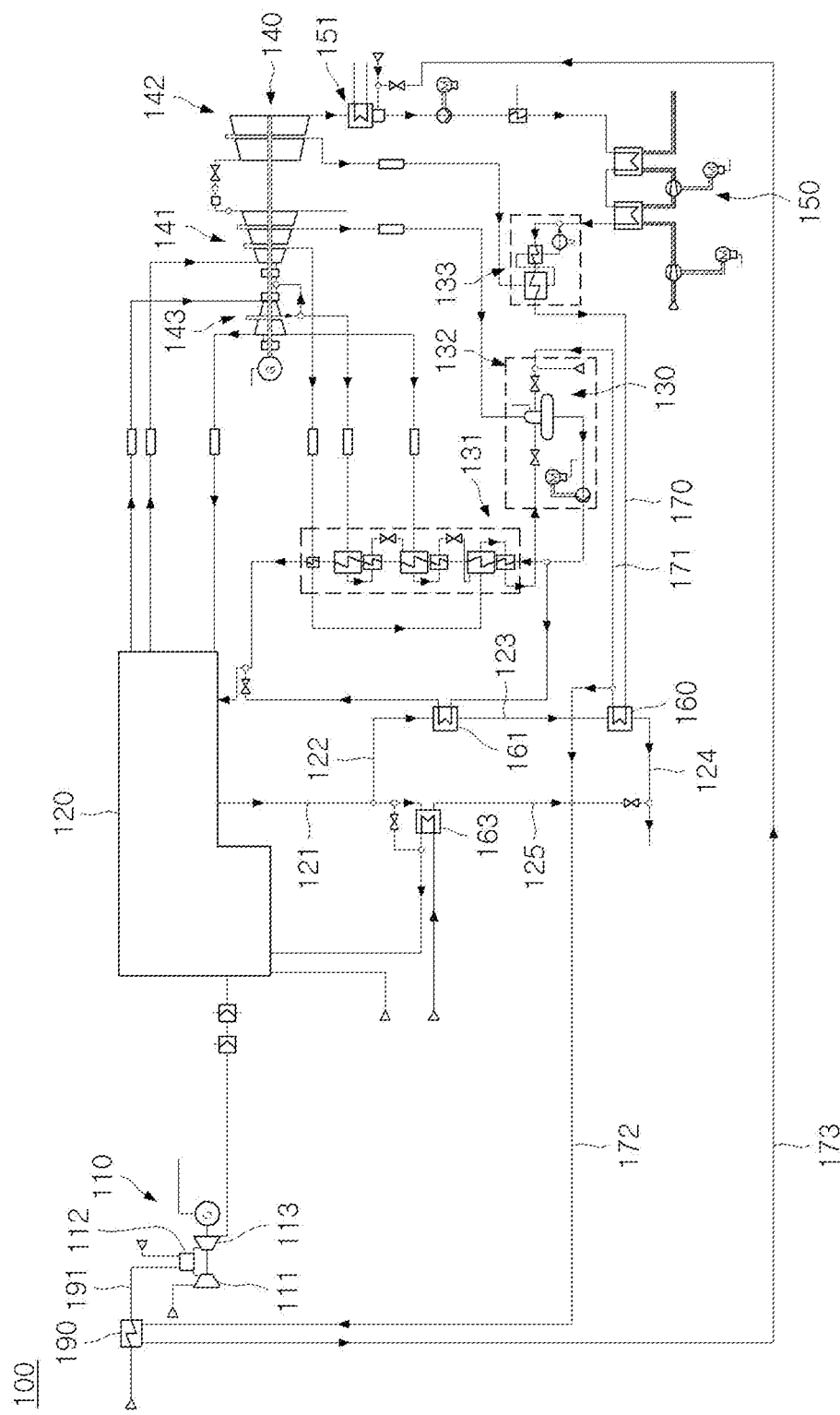
FIG. 2 is a diagram illustrating a hybrid power generation facility according to a first exemplary embodiment.

Referring to FIG. 2, a hybrid power generation facility 100 according to a first exemplary embodiment includes a gas turbine 110, a boiler 120, a water supply device 130, a steam turbine 140, an auxiliary heat exchanger 150, a first water heat exchanger 160, a second water heat exchanger 161, and a fuel-heat exchanger 190.

The gas turbine 110 uses natural gas as fuel to generate a driving force used for power generation. The gas turbine 110 includes a compressor 111, a combustor 112, and a turbine 113. The compressor 111 compresses air introduced from an outside to produce compressed air. The combustor 112 mixes the compressed air supplied from the compressor 111 with fuel and burns the air-fuel mixture. The turbine 113 generates a driving force used for generation of electric power using first combustion gas supplied from the combustor 112.

The boiler 120 receives the first combustion gas from the gas turbine 110, mixes the first combustion gas with fuel, and burns the fuel-gas mixture to produce second combustion gas.

The second combustion gas discharged from the boiler 120 passes through the first water heat exchanger 160. In the first water heat exchanger 160, intermediate-pressure and low-temperature water (e.g., 120° C.) heat exchanges with the second combustion gas to produce intermediate-pressure and intermediate-temperature water (e.g., 180° C.). The second water heat exchanger 161 is disposed between the boiler 120 and the first water heat exchanger 160. The second combustion gas first passes through the second water heat exchanger 161 and then flows through the first water heat exchanger 160. The air preheater 163 passes air supplied to the boiler 120 and also passes second combustion gas discharged from the boiler 120. In the air preheater 163, the second combustion gas preheats the air through heat exchange.

The water supply device 130 supplies water to the first water heat exchanger 160 and the second water heat exchanger 161. Steam generated by the boiler 120 passes through the steam turbine 140. That is, intermediate-pressure and intermediate-temperature water supplied to the boiler 120 is heated in the boiler 120 and is converted into superheated steam which is supplied to the steam turbine 140. The steam turbine 140 includes a high-pressure turbine 143, an intermediate-pressure turbine 141, and a low-pressure turbine 142. High-pressure steam passes through the high-pressure turbine 143. The intermediate-pressure turbine 141 is connected to the high-pressure turbine 143, and passes intermediate-pressure steam passing through the high-pressure turbine 143. The low-pressure turbine 142 is connected to the intermediate-pressure turbine 141, and passes low-pressure steam passing through the intermediate-pressure turbine 141. The water supply device 130 includes a high-pressure water supplier 131, an intermediate-pressure water supplier 132, and a low-pressure water supplier 133. The high-pressure water supplier 131 receives steam that has passed through the high-pressure turbine 143. The intermediate-pressure water supplier 132 receives steam that has passed through the intermediate-pressure turbine 141. The low-pressure water supplier 133 receives steam that has passed through the low-pressure turbine 142.

The water discharged from the low-pressure water supplier 133 passes through the first water heat exchanger 160. The water discharged from the intermediate-pressure water supplier 132 passes through the second water heat exchanger 161.

The auxiliary heat exchanger 150 passes water supplied to the low-pressure water supplier 133 from the condenser 151. In addition, high-temperature and high-pressure carbon dioxide discharged from the boiler 120 is collected and compressed. The compressed carbon dioxide passes through the auxiliary heat exchanger 150. As the high-temperature and high-pressure carbon dioxide and water exchange heat while passing through the auxiliary heat exchanger 150, the water is heated and is supplied to the low-pressure water supplier 133. When the second combustion gas discharged from the boiler 120 passes through the carbon dioxide collecting device, the carbon dioxide present in the second combustion gas is collected by the carbon dioxide collecting device and then compressed. The compressed carbon dioxide is supplied to the auxiliary heat exchanger 150. The carbon dioxide supplied to the auxiliary heat exchanger 150 heats the water in the auxiliary heat exchanger 150 and then flows out. The carbon dioxide discharged from the auxiliary heat exchanger 150 moves to the outside (e.g., to an oil drilling well).

The fuel supplied to the combustor 112 passes through the fuel heat exchanger 190, and a portion of the intermediate-pressure and intermediate-temperature water returned from the first water heat exchanger 160 to the water supply device 130 also passes through the fuel heat exchanger 190.

The hybrid power generation facility 100 according to the first exemplary embodiment further includes a first boiler pipeline 121, a second boiler pipeline 122, a third boiler pipeline 123, a fourth boiler pipeline 124, a fifth boiler pipeline 125, a first water pipeline 170, a second water pipeline 171, a third water pipeline 172, a fourth water pipeline 173, and a fuel pipeline 191.

The second combustion gas discharged from the boiler 120 flows through the first boiler pipeline 121. The second boiler pipeline 122 branched from the first boiler pipeline 121 transfers the second combustion gas to the second water heat exchanger 161. The third air pipeline 123 connects the first water heat exchanger 160 and the second water heat exchanger 161. The second combustion gas discharged from the first water heat exchanger 160 passes through the fourth boiler pipeline 124. The fifth boiler pipeline 125 connects the air preheater 163 and the fourth boiler pipeline 124, and transfers the second combustion gas discharged from the air preheater 163 to the fourth boiler pipeline 124.

The first water pipeline 170 transfers water from the low-pressure water supplier 133 to the first water heat exchanger 160. The second water pipeline 171 returns the water discharged from the first water heat exchanger 160 to the water supply device 130. The third water pipeline 172 branched from the second water pipeline 171 transfers low-pressure and low-temperature water to the fuel heat exchanger 190. The fourth water pipeline 173 transfers water from the fuel heat exchanger 190 to the condenser 151.

The fuel pipeline 191 connects the fuel heat exchanger 190 and the combustor 112, and transfers fuel from the fuel heat exchanger 190 to the combustor 112.

In the hybrid power generation facility 100 according to the present disclosure, the fuel heat exchanger 190 is disposed in front of the combustor 112 of the gas turbine 110, and the fuel supplied to the combustor 112 is first preheated in the fuel heat exchanger 190 and is then supplied to the combustor 112. Therefore, the output of the gas turbine 110 and the overall operation efficiency of the facility are improved, and the emission of carbon dioxide is reduced.

Figure 3:
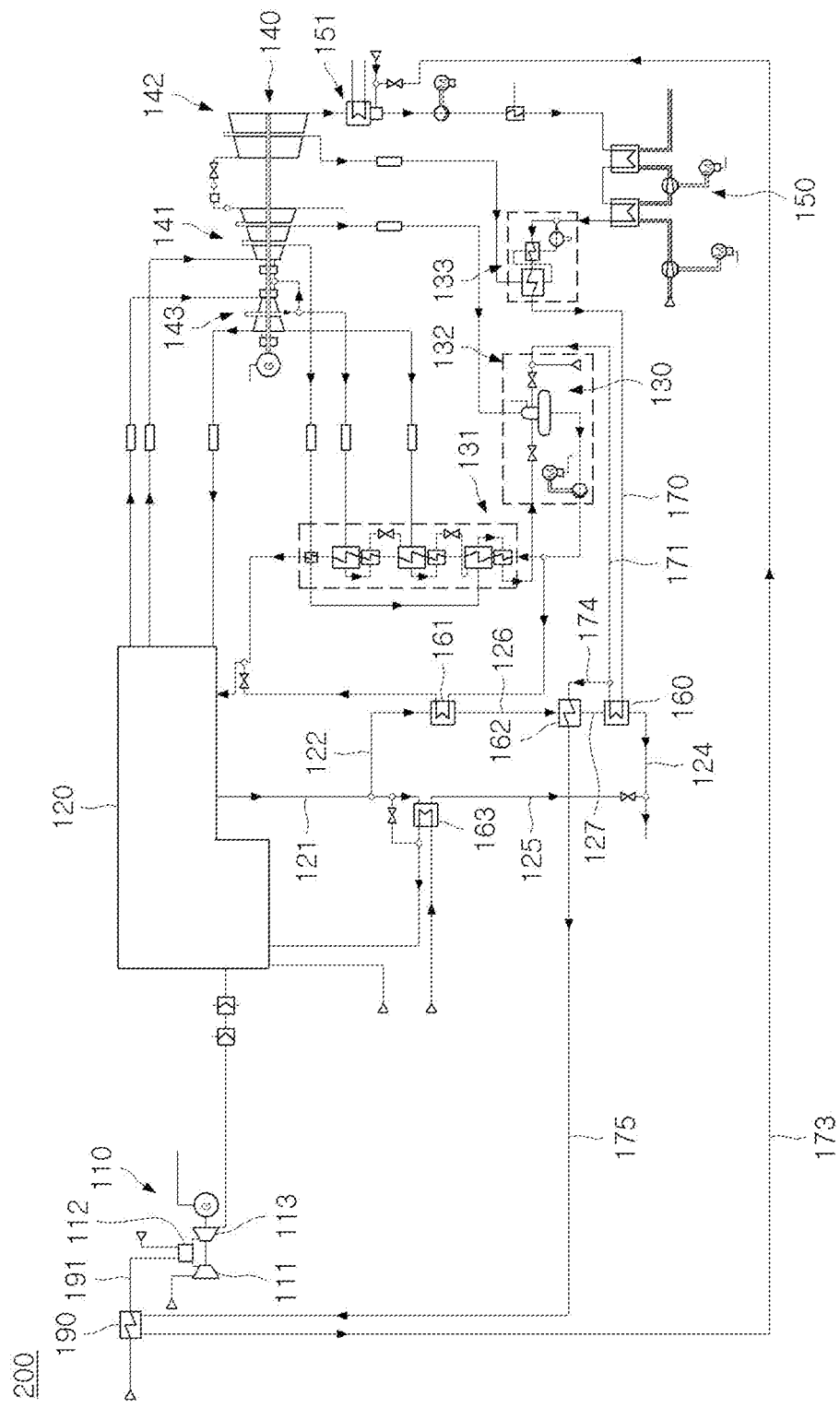
FIG. 3 is a diagram illustrating a hybrid power generation facility according to a second exemplary embodiment.

Referring to FIG. 3, in comparison with the first embodiment of the present invention, a hybrid power generation facility 200 according to a second exemplary embodiment further includes a third water heat exchanger 162, a sixth boiler pipeline 126, a seventh boiler pipeline 127, a fifth water pipeline 174, and a sixth water pipeline 175, as compared to the hybrid power generation facility 100 according to the first exemplary embodiment illustrated in FIG. 2.

The third water heat exchanger 162 is disposed between the first water heat exchanger 160 and the second water heat exchanger 161 so that the second combustion gas discharged from the second water heat exchanger 161 first passes through the third water heat exchanger 162 and then flows into the first water heat exchanger 160. In addition, a portion of intermediate-pressure and intermediate-temperature water discharged from the first water heat exchanger 160 passes through the third water heat exchanger 162 and then flows into the fuel heat exchanger 190.

The sixth boiler pipeline 126 transfers the second combustion gas from the second water heat exchanger 161 to the third water heat exchanger 162. The seventh boiler pipeline 127 transfers the second combustion gas from the third water heat exchanger 162 to the first water heat exchanger 160. The fifth water pipeline 174 branched from the second water pipeline 171 and transfers intermediate-pressure and intermediate-temperature water to the third water heat exchanger 162. The sixth water pipeline 175 transfers intermediate-pressure and high-temperature water (e.g., 250° C.) from the third water heat exchanger 162 to the fuel heat exchanger 190.

According to the second exemplary embodiment, the heated water supplied from the low-pressure water supplier 133 is primarily heated in the first water heat exchanger 160, the heated water is further heated through heat exchange between the water and the waste gas of the boiler 120 in the third water heat exchanger 162, and the further heated water is supplied to the fuel heat exchanger 190. Thus, the efficiency of heat exchange between fuel and low-pressure and high-temperature water in the fuel heat exchanger 190 is improved.

Figure 4:
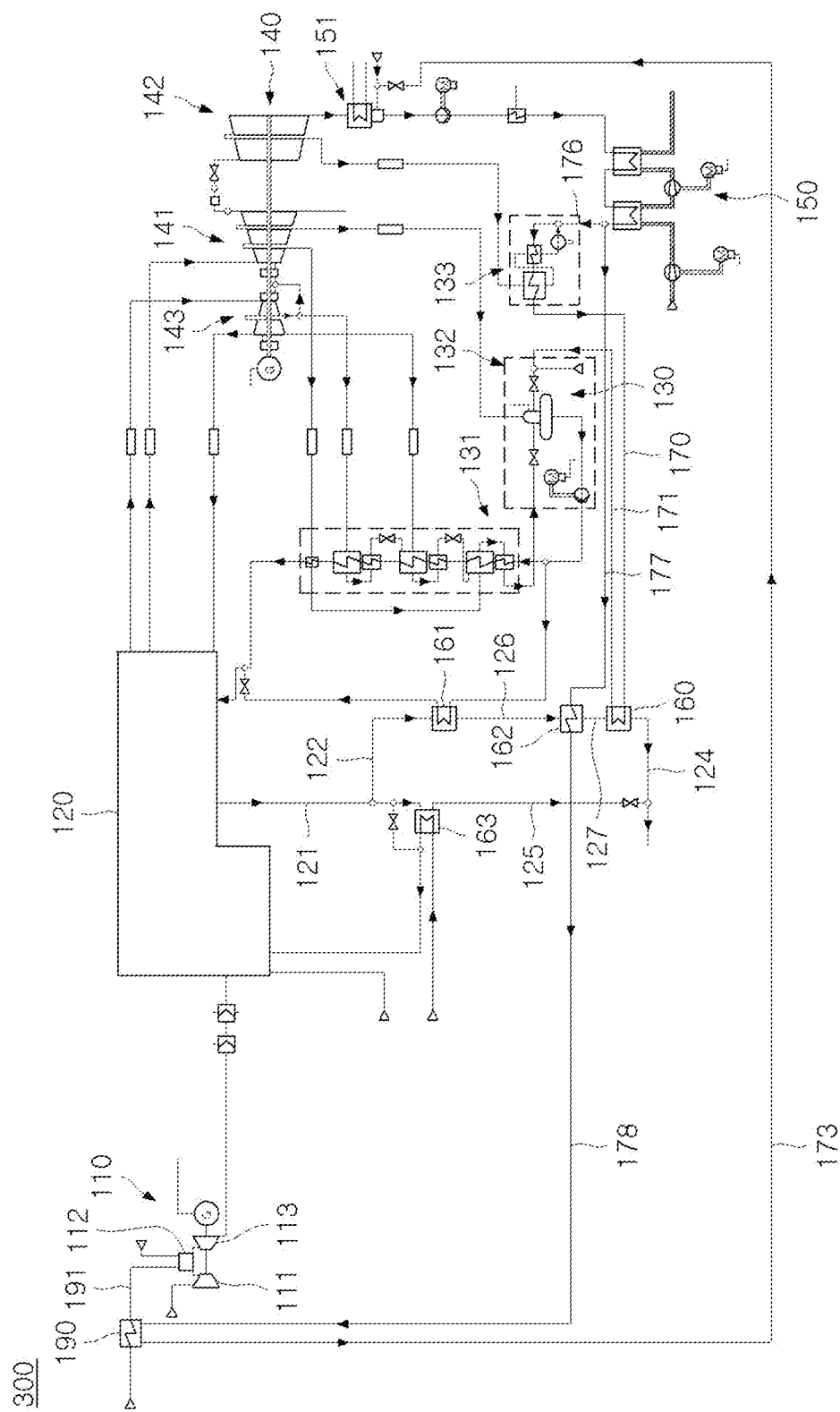
FIG. 4 is a diagram illustrating a hybrid power generation facility according to a third exemplary embodiment.

Referring to FIG. 4, a hybrid power generation facility 300 according to a third exemplary embodiment further includes a seventh water pipeline 176, an eighth water pipeline 177, and a ninth water pipeline 178, as compared to the hybrid power generation facility 100 according to the first exemplary embodiment illustrated in FIG. 2.

The seventh water pipeline 176 transfers water from the auxiliary heat exchanger 150 to the low-pressure water supplier 133 of the water supply device 130. The eighth water pipeline 177 branched from the seventh water pipeline 176 transfers water to the third water heat exchanger 162. The ninth water pipeline 178 transfers high-temperature water from the third water heat exchanger 162 to the fuel heat exchanger 190.

According to the third exemplary embodiment, the intermediate-pressure and low-temperature water supplied to the fuel heat exchanger 190 is preheated by the thermal energy of carbon dioxide in the auxiliary heat exchanger 150 so that intermediate-pressure and intermediate-temperature water is produced. The intermediate-pressure and intermediate-temperature water supplied to the fuel heat exchanger 190 is preheated by the third water heat exchanger 162 so that intermediate-pressure and high-temperature water is produced. Thus, the efficiency of heat exchange between the fuel and the intermediate-pressure and high-temperature water is improved.

Figure 5:
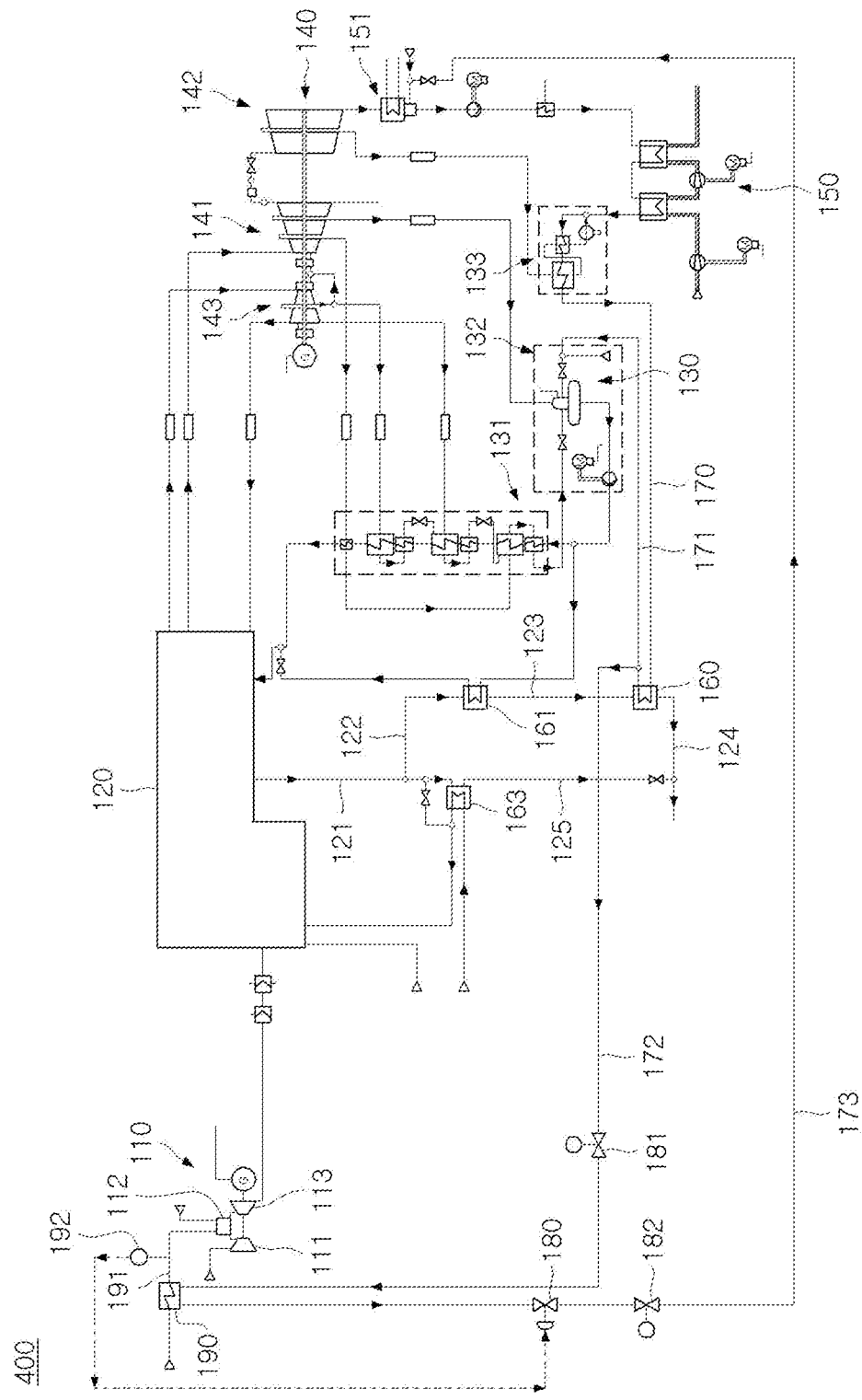
FIG. 5 is a diagram illustrating a hybrid power generation facility according to a fourth exemplary embodiment.

Referring to FIG. 5, a hybrid power generation facility 400 according to a fourth exemplary embodiment further includes a temperature sensor 192, a water valve 180, a first shut-off valve 181, and a second shut-off valve 182, as compared to the hybrid power generation facility 100 according to the first exemplary embodiment illustrated in FIG. 2.

The temperature sensor 192 is installed in the fuel pipeline 191 and measures the temperature of fuel flowing through the fuel pipeline 191. The water valve 180 is installed in the fourth water pipeline 173 and adjusts the flow rate of water flowing through the fourth water pipeline 173 according to the temperature measured by the temperature sensor 192. The first shut-off valve 181 is installed in the third water pipeline 172. The second shut-off valve 182 is installed in the fourth water pipeline 173. The second shut-off valve 182 is installed in the downstream side of the water valve 180 in a flow direction of water flowing through the fourth water pipeline 173.

According to the fourth exemplary embodiment, the flow rate of water flowing to the fuel heat exchanger 190 is adjusted according to the temperature of the fuel supplied to the combustor 112 through the fuel pipeline 191. The temperature of the fuel supplied to the combustor 112 is set as a target temperature. In a specific situation, it is possible to prevent water from being supplied to the fuel heat exchanger 190 by blocking the third water pipeline 172 and the fourth water pipeline 173 with the first shut-off valve 181 and the second shut-off valve 182.

Figure 6:
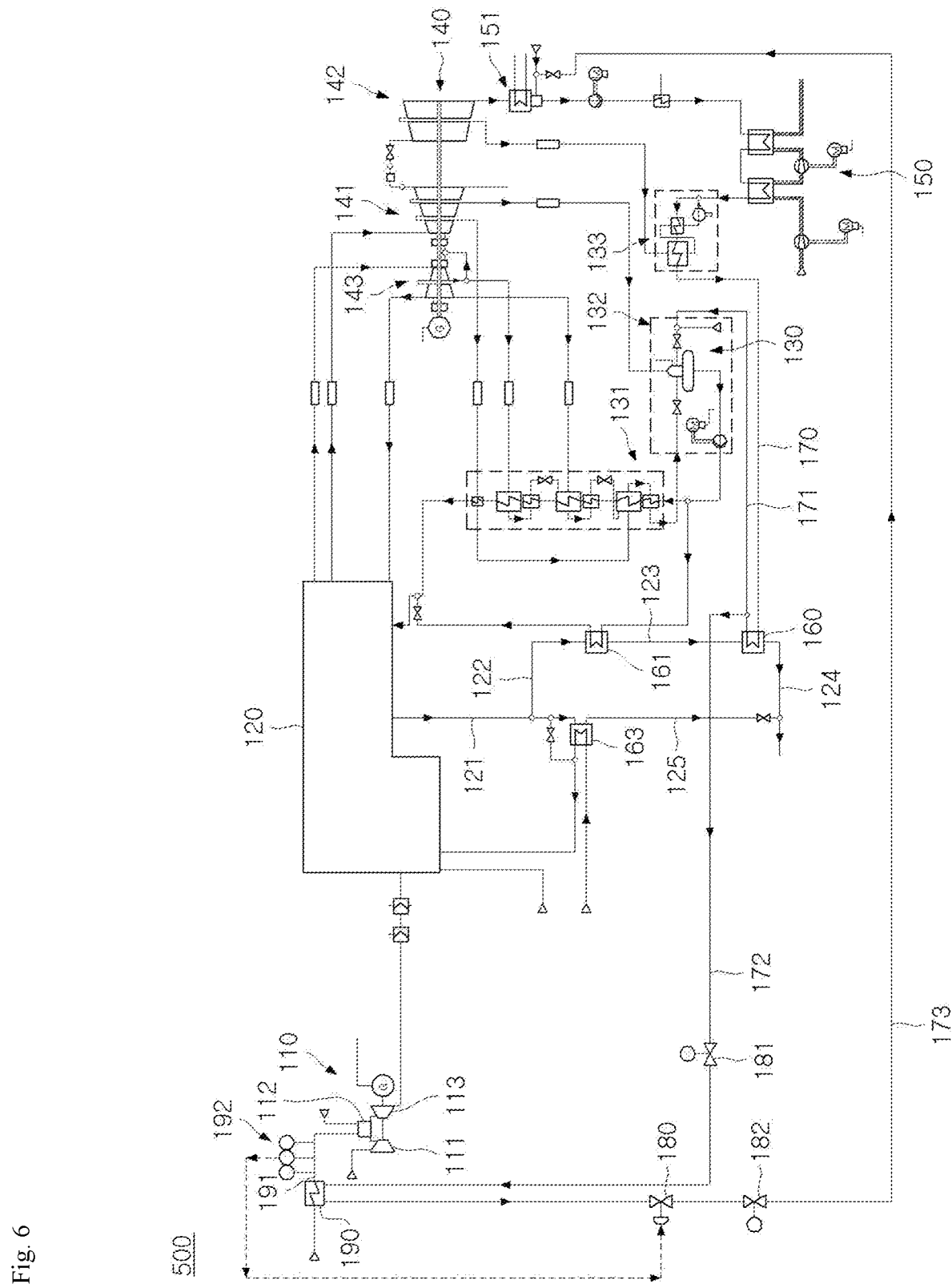
FIG. 6 is a diagram illustrating a hybrid power generation facility according to a fifth exemplary embodiment.

Referring to FIG. 6, a hybrid power generation facility 500 according to a fifth exemplary embodiment includes a plurality of temperature sensors 192, and the water valve 180 adjusts the flow rate of water according to an average value of the temperatures measured by the plurality of temperature sensors 192.

According to the fifth exemplary embodiment, one measured value with the lowest reliability among the measured values of the plurality of temperature sensors 192 is discarded, and the flow rate of water is adjusted with the water valve 180 according to the average value obtained from remaining values. Accordingly, the temperature of the fuel supplied to the combustor 112 can be more precisely controlled.

The fourth and fifth exemplary embodiments have been described while comparing with the first exemplary embodiment, but the embodiments are merely exemplary. The concepts of the fourth and fifth exemplary embodiments can be applied to the second and third exemplary embodiments, respectively. Therefore, the first shut-off valve 181 may be installed in the sixth water pipeline 175 or the ninth water pipeline 178.

What is claimed is:

1. A hybrid power generation facility comprising:
   a gas turbine including a compressor configured to compress air introduced from an outside, a combustor configured to mix the compressed air with fuel and to combust the air and fuel mixture, and a turbine configured to produce power with first combustion gas discharged from the combustor;
   a boiler configured to burn a mixture of the first combustion gas and air;
   a first water heat exchanger configured to pass second combustion gas discharged from the boiler and to heat water through heat exchange with the second combustion gas;
   a water supply device configured to supply water to the first water heat exchanger;
   a steam turbine through which steam generated in the boiler passes; and
   a fuel heat exchanger configured to pass fuel supplied to the combustor and to pass a portion of water that is returned to the water supply device from the first water heat exchanger and has a higher temperature than the water supplied to the first water heat exchanger.

2. The hybrid power generation facility according to claim 1, further comprising:
   a first water pipeline configured to transfer water from the water supply device to the first water heater exchanger;
   a second water pipeline configured to return water discharged from the first water heat exchanger to the water supply device; and
   a third water pipeline branched from the second water pipeline and configured to supply water having a higher temperature than the water supplied to the first water heat exchanger to the fuel heat exchanger.

3. The hybrid power generation facility according to claim 2, further comprising:
   a fourth water pipeline configured to transfer water discharged from the fuel heat exchanger to a condenser.

4. The hybrid power generation facility according to claim 3, further comprising:
   a fuel pipeline configured to connect the fuel heat exchanger and the combustor;
   a temperature sensor installed in the fuel pipeline and configured to measure a temperature of fuel flowing through the fuel pipeline; and
   a water valve installed in the fourth water pipeline and configured to adjust a flow rate of water flowing through the fourth water pipeline according to a water temperature measured by the temperature sensor.

5. The hybrid power generation facility according to claim 4, further comprising:
a first shut-off valve installed in the third water pipeline; and
a second shut-off valve installed in the fourth water pipeline.

6. The hybrid power generation facility according to claim 5, wherein the second shut-off valve is disposed in a downstream side of the water valve in a flow direction of water flowing through the fourth water pipeline.

7. The hybrid power generation facility according to claim 4, wherein the temperature sensor includes a plurality of temperature sensors, and
the water valve adjusts a flow rate of water according to an average value of the temperatures measured by the plurality of temperature sensors.

8. The hybrid power generation facility according to claim 1, wherein the steam turbine includes an intermediate-pressure turbine and a low-pressure turbine connected to the intermediate-pressure turbine and configured to pass steam having a pressure lower than that of steam flowing through the intermediate-pressure turbine,
wherein the water supply device includes an intermediate-pressure water supplier configured to receive steam passing through the intermediate-pressure turbine and a low-pressure water supplier configured to receive steam passing through the low-pressure turbine, and
wherein the first water heat exchanger is configured to pass water passing through the low-pressure water supplier.

9. The hybrid power generation facility according to claim 8, further comprising:
a second water heat exchanger configured to pass second combustion gas discharged from the boiler and to pass water discharged from the intermediate-pressure water supplier.

10. The hybrid power generation facility according to claim 9, further comprising:
a first boiler pipeline configured to pass second combustion gas discharged from the boiler;
a second boiler pipeline branched from the first boiler pipeline and configured to supply second combustion gas to the second water heat exchanger; and
a third boiler pipeline configured to connect the first water heat exchanger and the second water heat exchanger.

11. The hybrid power generation facility according to claim 10, further comprising:
an air preheater connected to the first boiler pipeline and configured to pass second combustion gas flowing through the first boiler pipeline;
a fourth boiler pipeline configured to pass second combustion gas discharged from the first water heat exchanger; and
a fifth boiler pipeline configured to connect the air preheater and the fourth boiler pipeline and transfer second combustion gas discharged from the air preheater to the fourth boiler pipeline.

12. The hybrid power generation facility according to claim 9, further comprising:
a third water heat exchanger disposed between the first water heat exchanger and the second water heat exchanger and configured to pass second combustion gas discharged from the second water heat exchanger before flowing into the first water heat exchanger and to pass a portion of water that has passed through the first water heat exchanger and has a higher temperature than water supplied to the first water heat exchanger before flowing into the fuel heat exchanger.

13. The hybrid power generation facility according to claim 12, further comprising:
a sixth boiler pipeline configured to transfer second combustion gas from the second water heat exchanger to the third water heat exchanger;
a seventh boiler pipeline configured to transfer second combustion gas from the third water heat exchanger to the first water heat exchanger;
a fifth water pipeline branched from the second water pipeline and configured to supply water having a higher temperature than water supplied to the first water heat exchanger to the third water heat exchanger; and
a sixth water pipeline configured to supply water having a higher temperature than water supplied to the third water heat exchanger to the fuel heat exchanger.

14. The hybrid power generation facility according to claim 10, further comprising:
a first water pipeline configured to transfer water from the water supply device to the first water heater exchanger;
a second water pipeline configured to return water discharged from the first water heat exchanger to the water supply device;
a third water pipeline branched from the second water pipeline and configured to supply water having a higher temperature than the water supplied to the first water heat exchanger to the fuel heat exchanger;
a fourth water pipeline configured to transfer water discharged from the fuel heat exchanger to a condenser;
a first shut-off valve installed in the sixth water pipeline; and
a second shut-off valve installed in the fourth water pipeline.

15. The hybrid power generation facility according to claim 14, further comprising a water valve installed in the fourth water pipeline and configured to adjust a flow rate of water flowing through the fourth water pipeline,
wherein the second shut-off valve is disposed in a downstream side of the water valve in a flow direction of water flowing through the fourth water pipeline.

16. The hybrid power generation facility according to claim 8, further comprising:
an auxiliary heat exchanger configured to pass water supplied from a condenser to the low-pressure water supplier and to pass carbon dioxide that is collected from the second combustion gas discharged from the boiler and is compressed to heat water.

17. The hybrid power generation facility according to claim 1, further comprising:
an auxiliary heat exchanger configured to pass water supplied from a condenser to the water supply device and to pass carbon dioxide that is collected from the second combustion gas discharged from the boiler and is compressed to heat water;
a seventh water pipeline configured to transfer water from the auxiliary heat exchanger to the water supply device;
a second water heat exchanger configured to pass second combustion gas discharged from the boiler;
a third water heat exchanger disposed between the first water heat exchanger and the second water heat exchanger and configured to pass second combustion gas supplied to the first water heat exchanger;
an eighth water pipeline branched from the seventh water pipeline and configured to supply water to the third water heat exchanger; and a ninth water pipeline configured to transfer water having a higher temperature than water supplied to the third water heat exchanger from the third water heat exchanger to the fuel heat exchanger.

18. The hybrid power generation facility according to claim 17, further comprising:

a first water pipeline configured to transfer water from the water supply device to the first water heater exchanger;

a second water pipeline configured to return water discharged from the first water heat exchanger to the water supply device;

a third water pipeline branched from the second water pipeline and configured to supply water having a higher temperature than the water supplied to the first water heat exchanger to the fuel heat exchanger;

a fourth water pipeline configured to transfer water discharged from the fuel heat exchanger to a condenser;

a first shut-off valve installed in the ninth water pipeline; and a second shut-off valve installed in the fourth water pipeline.

19. The hybrid power generation facility according to claim 18, further comprising a water valve installed in the fourth water pipeline and configured to adjust a flow rate of water flowing through the fourth water pipeline, wherein the second shut-off valve is disposed in a downstream side of the water valve in a flow direction of water flowing through the fourth water pipeline.

\* \* \* \* \*